(12) United States Patent
Dingman et al.

(10) Patent No.: US 11,904,730 B2
(45) Date of Patent: Feb. 20, 2024

(54) REMOVABLE SEATS AND LAWNMOWERS WITH REMOVABLE SEATS

(71) Applicant: Techtronic Cordless GP, Anderson, SC (US)

(72) Inventors: Trent J. Dingman, Greenville, SC (US); Michael Feng, Seneca, SC (US)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 17/742,455

(22) Filed: May 12, 2022

(65) Prior Publication Data

US 2022/0363163 A1 Nov. 17, 2022

Related U.S. Application Data

(60) Provisional application No. 63/188,713, filed on May 14, 2021.

(51) Int. Cl.
*B60N 2/015* (2006.01)

(52) U.S. Cl.
CPC .................. *B60N 2/01508* (2013.01)

(58) Field of Classification Search
CPC .............. B60N 2/3097; B60N 2/01583; B60N 2/01508; B60N 2/01516; B60N 2/38; B60N 2/06; B60N 2/12
USPC ...... 296/65.13, 65.03; 297/335, 325, 344.11, 297/344.1
See application file for complete search history.

(56) References Cited

U.S. PATENT DOCUMENTS

| | | | |
|---|---|---|---|
| 4,978,158 A * | 12/1990 | Kubo | ................. B60N 2/366 297/15 |
| 5,239,810 A | 8/1993 | Gugel | |
| 5,443,239 A | 8/1995 | Laporte | |
| 6,283,550 B1 * | 9/2001 | Vialatte | ................ B60N 2/3011 297/335 |
| 6,312,037 B1 * | 11/2001 | Garrido | ............. B60N 2/01558 296/65.13 |
| 6,345,856 B1 | 2/2002 | Minai | |
| 6,497,453 B2 | 3/2002 | Bates | |

(Continued)

FOREIGN PATENT DOCUMENTS

| | | |
|---|---|---|
| CA | 2458960 C | 9/2004 |
| CN | 203402299 U | 1/2014 |

(Continued)

OTHER PUBLICATIONS

European Search Report Corresponding with Application No. EP22173364 dated Oct. 12, 2022 (1 page).

*Primary Examiner* — Lori Lyjak
(74) *Attorney, Agent, or Firm* — Dority & Manning, P.A.

(57) ABSTRACT

Removable seats and lawnmowers with removable seats are provided. A lawnmower includes a frame; a walking element coupled to the frame to move the lawnmower relative to an underlying ground surface; and a seat selectively coupled to the frame, the seat including: one or more rails; a lower support adjustably coupled to the one or more rails; a backrest coupled to the lower support; and a latch coupled to the lower support through at least one of the one or more rails, the latch being selectively engageable with the frame to maintain the seat in a riding position, wherein the seat is removable from the frame by rotating the seat about a horizontal axis.

20 Claims, 5 Drawing Sheets

(56) References Cited

U.S. PATENT DOCUMENTS

| | | | |
|---|---|---|---|
| 6,431,632 B1 * | 8/2002 | Kozikowski | B60N 2/01583 297/336 |
| 6,773,049 B2 | 4/2004 | Rupiper | |
| 6,935,092 B2 | 8/2005 | Velke | |
| 6,945,505 B2 | 9/2005 | Hohnl | |
| 7,325,876 B2 | 2/2008 | Lavoie et al. | |
| 7,540,134 B1 | 6/2009 | Reich | |
| 7,562,515 B2 | 7/2009 | Komorida | |
| 7,648,115 B2 | 1/2010 | Lambert | |
| 8,016,258 B1 | 9/2011 | Boyarski | |
| 8,393,432 B2 | 3/2013 | Boyarski | |
| 8,561,748 B1 | 10/2013 | Hahn | |
| 8,690,114 B2 | 4/2014 | Boyarski | |
| 9,096,151 B2 | 8/2015 | Canonge | |
| 9,216,673 B2 | 12/2015 | Braun | |
| 9,393,883 B2 | 7/2016 | Wojatzki | |
| 9,510,503 B2 | 12/2016 | Elhardt | |
| 9,821,689 B2 | 7/2017 | Busboom | |
| 10,023,083 B1 | 7/2018 | Tada | |
| 10,173,560 B2 | 1/2019 | Ochs | |
| 10,245,984 B2 | 4/2019 | Parker | |
| 10,315,534 B2 | 6/2019 | Shibata | |
| 10,549,670 B1 | 2/2020 | Smith | |
| 10,550,541 B1 | 2/2020 | Diaz | |
| 10,829,083 B2 | 4/2020 | Nelson | |
| 2007/0169455 A1 | 7/2007 | Umemoto et al. | |
| 2017/0174101 A1 * | 6/2017 | Gebauer | B60N 2/01516 |
| 2017/0203673 A1 * | 7/2017 | Parker | A01D 34/86 |
| 2019/0002107 A1 * | 1/2019 | Mair | B60N 2/01583 |
| 2019/0344686 A1 * | 11/2019 | Kavanagh | B60N 2/3013 |
| 2019/0381916 A1 | 12/2019 | Hill | |
| 2020/0022303 A1 | 1/2020 | Gindt | |
| 2020/0120871 A1 | 4/2020 | Woodrum | |
| 2020/0245561 A1 | 8/2020 | Hiller | |
| 2020/0353850 A1 | 11/2020 | Teraoka | |
| 2021/0061146 A1 | 3/2021 | Stover | |
| 2021/0122266 A1 | 4/2021 | Haller | |
| 2021/0144915 A1 | 5/2021 | Tsuduki | |

FOREIGN PATENT DOCUMENTS

| | | | |
|---|---|---|---|
| CN | 204669894 U | 9/2015 | |
| CN | 107172958 B | 9/2017 | |
| CN | 107432161 A | 12/2017 | |
| CN | 108391497 B | 8/2018 | |
| CN | 208045336 U | 11/2018 | |
| CN | 209185035 U | 8/2019 | |
| CN | 209390707 U | 9/2019 | |
| CN | 110809996 A | 2/2020 | |
| CN | 111758368 A | 10/2020 | |
| CN | 212993068 U | 4/2021 | |
| DE | 202004013887 U1 | 1/2006 | |
| DE | 202014102119 U1 | 5/2014 | |
| EP | 2298591 B1 | 3/2011 | |
| EP | 2364585 B1 | 9/2011 | |
| EP | 3186105 B1 | 7/2017 | |
| FR | 2886897 A1 | 12/2006 | |
| GB | 1327027 A | 8/1973 | |
| JP | 2002059767 A | 2/2002 | |
| JP | 2011098716 A * | 5/2011 | B60N 2/01583 |
| WO | WO2015025778 A1 | 2/2015 | |
| WO | WO2021047194 A1 | 3/2021 | |

* cited by examiner

REMOVABLE SEATS AND LAWNMOWERS WITH REMOVABLE SEATS

CROSS-REFERENCE TO RELATED APPLICATIONS

The present application claims priority to U.S. Provisional Patent Application 63/188,713 filed on May 14, 2021, the disclosure of which is incorporated by reference herein in its entirety.

FIELD

The present disclosure relates generally to removable seats, and more particularly to removable seats for use with lawnmowers.

BACKGROUND

Lawnmowers are generally utilized to maintain the appearance of grass in a yard. Lawnmowers typically include one or more cutting implements which rotate to trim the grass. Different types of lawnmowers include push lawnmowers, self-propelled lawnmowers, and riding lawnmowers. Riding lawnmowers allow the operator to ride the lawnmower without having to push or walk behind the lawnmower. Some riding lawnmowers include seats upon which the operator can sit when using the lawnmower.

In certain instances, the seat of the lawnmower may be disposed over one or more areas of the lawnmower which require access. For example, the seat may be disposed over a battery of the lawnmower, a motor of the lawnmower, an engine of the lawnmower, circuits or electronics of the lawnmower, or the like. Access to this area may be desirable.

Accordingly, improved lawnmower seats are desired in the art. In particular, lawnmower seats which are removable to provide easy access to one or more storage areas of the lawnmower would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a riding lawnmower is provided. The riding lawnmower includes a frame; a walking element coupled to the frame to move the lawnmower relative to an underlying ground surface; and a seat selectively coupled to the frame, the seat comprising: one or more rails; a lower support adjustably coupled to the one or more rails; a backrest coupled to the lower support; and a latch coupled to the lower support through at least one of the one or more rails, the latch being selectively engageable with the frame to maintain the seat in a riding position, wherein the seat is removable from the frame by rotating the seat about a horizontal axis.

In accordance with another embodiment, a seat for a lawnmower is provided. The seat includes a one or more rails; a lower support adjustably coupled to the one or more rails; a backrest coupled to the lower support; and a latch coupled to the lower support through at least one of the one or more rails, the latch being selectively engageable with a frame of the lawnmower to maintain the seat in a riding position, wherein the seat is configured to be removable from the frame by rotating the seat about a horizontal axis.

In accordance with another embodiment, a method of removing a seat from a lawnmower is provided. The method includes rotating the seat about an axis until the seat reaches a first threshold; upon reaching the first threshold, translating the seat in a first direction to reach a second threshold; and upon reaching the second threshold, translating the seat in a second direction angularly offset from the first direction.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, lawnmowers and seats for lawnmowers in accordance with embodiments described herein may allow an operator to quickly and easily remove the seat, e.g., to allow access to an underlying area of the lawnmower. In an embodiment, the seat may be rotatable about an axis between an in-use position and a first threshold position. The seat can then be translated in a first direction to reach a second threshold position. Upon reaching the second threshold position, the seat can be translated in a second direction angularly offset from the first direction to allow for removal of the seat from the lawnmower. In accordance with embodiments described herein, the operator can remove the seat without the use of tools and without moving, e.g., activating, any portion of the lawnmower other than the seat.

Figure 1:
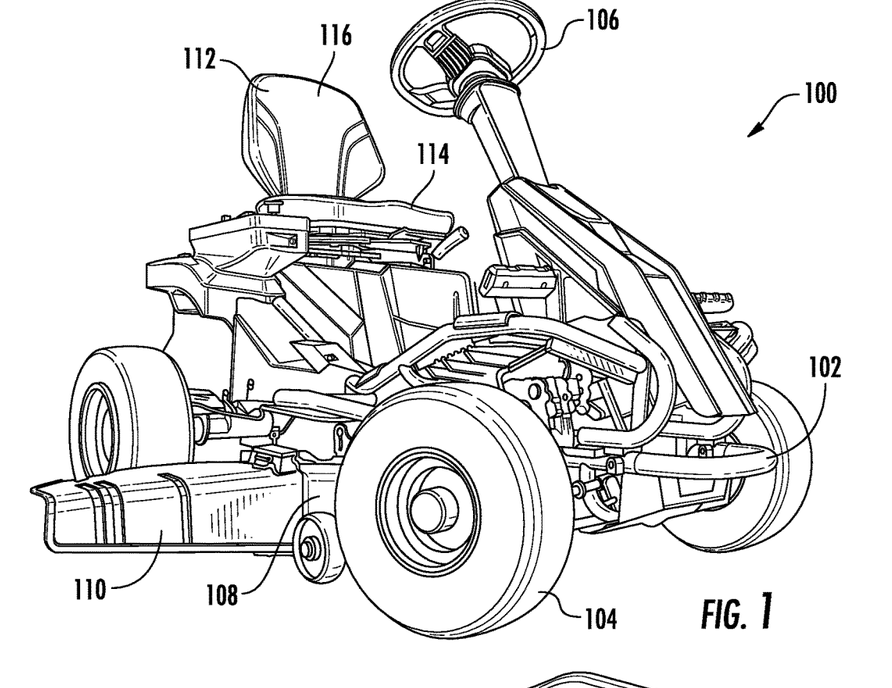
FIG. 1 is a perspective view of a lawnmower in accordance with embodiments of the present disclosure.

Referring now to the drawings, FIG. 1 illustrates a perspective view of an exemplary lawnmower 100 in accordance with an embodiment of the present disclosure. The lawnmower 100 can generally include a frame 102 defining a supporting structure of the lawnmower 100. A walking element 104, such as one or more wheels, treads, or the like can be coupled to the frame 102. The walking element 104 can permit movement of the lawnmower 100 relative to an underlying ground surface. A steering element 106 can be operatively coupled to the walking element 104 to allow selective redirection of the lawnmower 100. By way of non-limiting example, the steering element 106 can include a steering wheel, a joystick, one or more lap bars, or the like. A mowing deck 108 can be supported by the frame 102 and house one or more cutting implements, such as one or more rotatable blades, which can cut grass and debris located at the underlying surface. The mowing deck 108 can be in fluid communication with a discharge chute 110 which can direct discharge from the mowing deck 108 to a side of the lawnmower 100. While not illustrated, the lawnmower 100 can further include one or more motive devices, such as, e.g., one or more electric motors, one or more gas powered engines or a combination thereof, to drive either one or both of the walking element 104 and the one or more cutting implements. By way of non-limiting example, the motive device(s), or an energy source thereof (e.g., an electric battery or gas tank), can be disposed below a seat 112 of the lawnmower 100.

The seat 112 can generally include a lower support 114 upon which the rider can sit when riding the lawnmower 100, and a backrest 116 coupled to the lower support 114. In certain instances, the backrest 116 can be statically coupled to the lower support 114. In other instances, the backrest 116 can be dynamically coupled to the lower support 114 such that the backrest 116 is movable, e.g., rotatable or translatable, with respect to the lower support 114.

Figure 2:
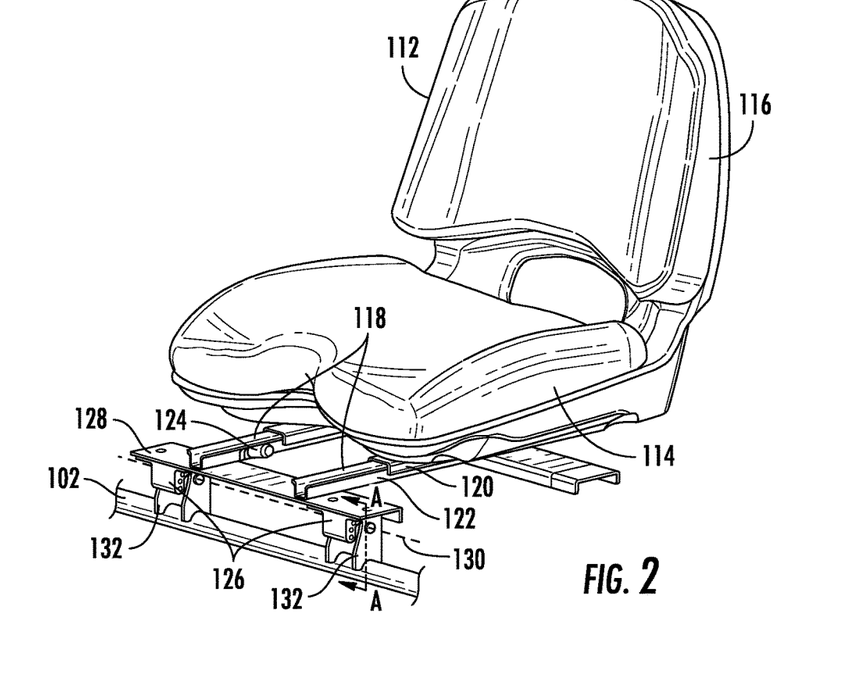
FIG. 2 is a perspective view of a seat of the lawnmower in accordance with embodiments of the present disclosure.

FIG. 2 illustrates a front perspective view of the seat 112 in accordance with an exemplary embodiment. The lower support 114 and backrest 116 of the seat 112 depicted in FIG. 2 are statically coupled together. The lower support 114 or backrest 116 can be coupled to one or more rails 118. The rail(s) 118 can include, for example, one rail, two rails, three rails, four rails, or the like. In an embodiment, the rail(s) 118 can extend in a direction parallel, or generally parallel, with a length dimension of the lawnmower 100.

The rail(s) 118 can allow the seat 112 to be adjusted relative to the frame 102 of the lawnmower 100. For example, a distance between the seat 112 and the steering element 106 can be adjustable to fit riders of various sizes. By way of non-limiting example, the rail(s) 118 can include a first portion 120 coupled to the lower support 114 or backrest 116 and a second portion 122 moveable relative to the first portion 120. In an embodiment, the first and second portions 120 and 122 can be infinitely adjustable between two adjustment end points. Infinite adjustment may refer to instances where there are no preset stops or locked positions and instead the operator can adjust and lock the seat at any location between two end points of maximum travel. In another embodiment, the first and second portions 120 and 122 can be adjustable between a plurality of predetermined stop positions. To adjust the seat 112, the operator can actuate an actuatable member 124, such as a lever, to allow the first and second portions 120 and 122 of the rail(s) 118 to move relative to one another. Once reaching the desired location, the operator can release the actuatable member 124 to lock the first and second portions 120 and 122 together.

In an embodiment, the lower support 114 of the seat 112 can be coupled to a latch 126 through at least one of the rails 118. In the depicted embodiment, the lawnmower 100 includes a plurality of latches 126. The latches 126 can interact with the frame 102 to couple the seat 112 to the frame 102 and maintain the seat 112 in a riding position.

In an embodiment, the latches 126 can be coupled to the rails 118 through an intermediary member 128. The intermediary member 128 can extend between and couple the rails 118 together. In another embodiment, the latches 126 can be coupled directly to the rails 118.

The latches 126 can be aligned with one another in a lateral direction. For example, the latches may be similarly arranged with respect to one another relative to an axis 130. As described below, the seat 112 can be removed from the lawnmower 100 by rotating the seat 112 forward about the axis 130. Alignment of the latches 126 relative to the axis 130 facilitates rotation and removal of the seat 112.

The latches 126 can be coupled to the frame 102 through one or more latch engagement mechanisms 132. In the embodiment depicted in FIG. 2, each latch 126 is interfaced with a discrete latch engagement mechanism 132. In another embodiment, at least two of the latches 126 can interface with a common latch engagement mechanism 132.

Figure 3:
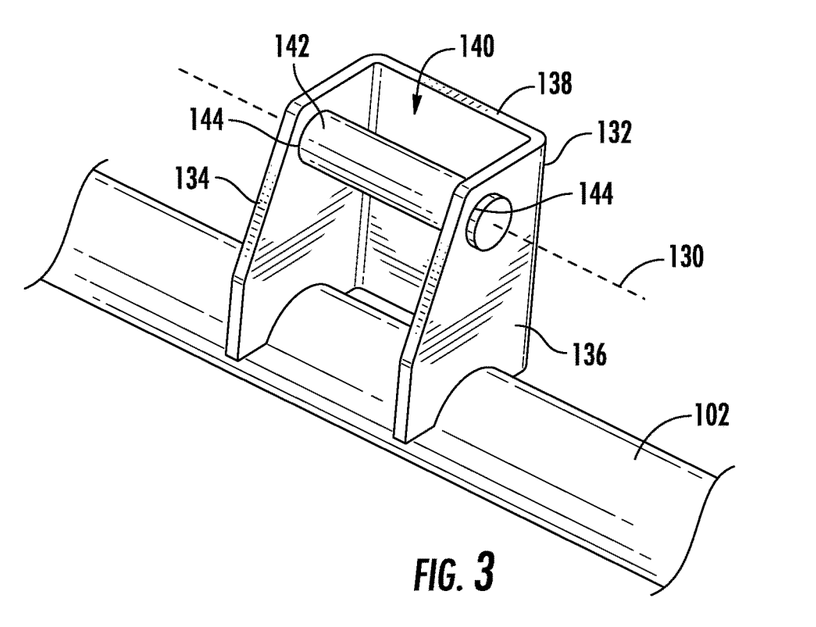
FIG. 3 is a perspective view of a latch engagement mechanism of the lawnmower in accordance with embodiments of the present disclosure.

FIG. 3 illustrates the latch engagement mechanism 132 in accordance with an exemplary embodiment. The depicted latch engagement mechanism 132 generally includes a first sidewall 134, a second sidewall 136, and a third sidewall 138. In certain instances, the first, second and third sidewalls 134, 136 and 138 can be formed from a continuous piece of material. The first and second sidewalls 134 and 136 can be coupled to the frame 102. For example, the first and second sidewalls 134 and 136 can be welded to the frame 102, adhered to the frame 102 using adhesive, fastened to the frame 102 using one or more threaded or non-threaded fasteners (not illustrated), or the like. The third sidewall 138 can extend between the first and second sidewalls 134 and 136 at a rear location of the latch engagement mechanism 132. The first, second and third sidewalls 134, 136 and 138 can together define a receiving area 140 in which the latch 126 can be received. As described in greater detail below, the third sidewall 138 can define a stop which prevents the latch 126 (FIG. 2) from translating out of the receiving area 140 in at least a rearward direction when the seat 112 is coupled to the frame 102.

The latch engagement mechanism 132 can further include a stud 142 which interfaces with the latch 126 to couple the seat 112 to the frame 102 of the lawnmower 100. The stud 140 can extend from at least one of the first or second sidewalls 134 or 136 into the receiving area 140 of the latch engagement mechanism 132. In an embodiment, the stud 142 can extend between the first and second sidewalls 134 and 136. For example, the first and second sidewalls 134 and 136 can each include an opening 144 through which the stud 142 passes. In this regard, the stud 142 can be supported by the first and second sidewalls 134 and 136. The stud 142 can form the axis 130 about which the seat 112 rotates to move between the in-use, riding position and the disengageable position.

Figure 4:
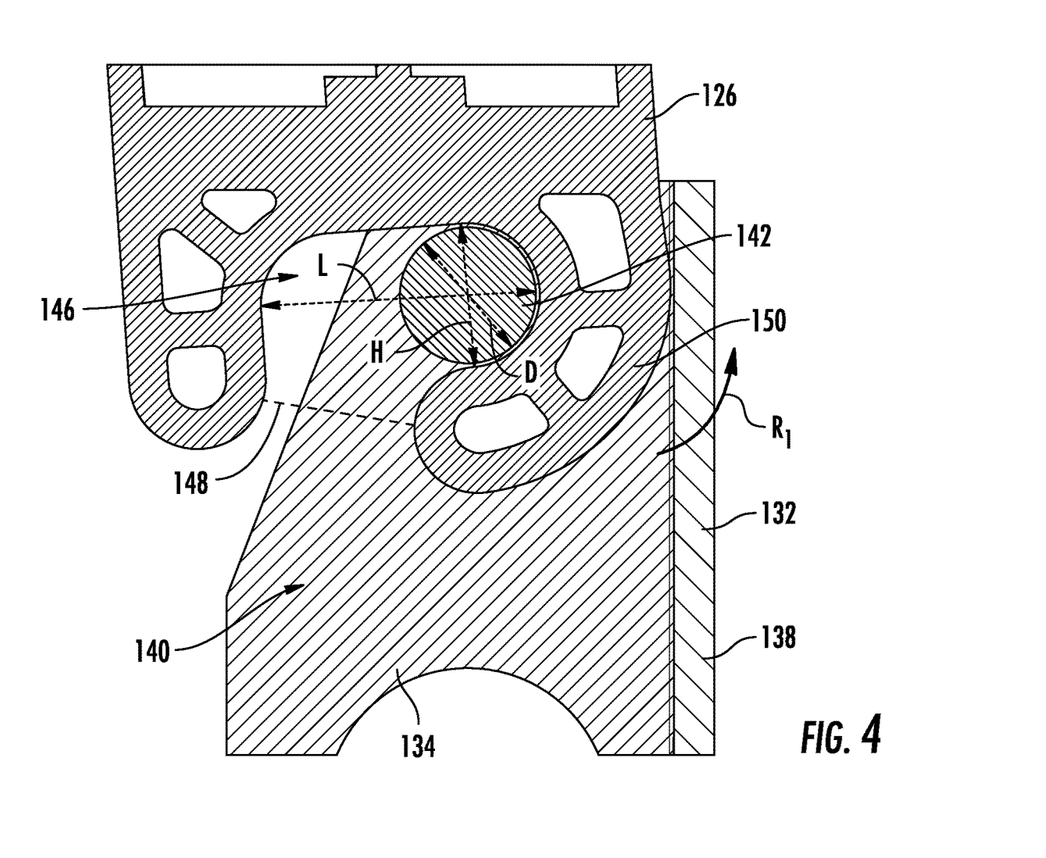
FIG. 4 is a cross-sectional side view of a latch of the seat coupled to the latch engagement mechanism as seen in the in-use riding position in accordance with embodiments of the present disclosure, as seen along Line A-A in FIG. 2.

FIG. 4 illustrates a side view of the latch 126 interfaced with the latch engagement mechanism 132 as seen along Line A-A in FIG. 2 in accordance with an exemplary embodiment. As depicted, the latch 126 can define a stud receiving area 146 that receives the stud 142 to selectively couple the latch 126 to the frame 102. In the in-use, riding position, the latch 126 can surround at least 50% of the circumference of the stud 142, such as at least 60% of the circumference of the stud 142, such as at least 70% of the circumference of the stud 142, such as at least 75% of the circumference of the stud 142, such as at least 80% of the circumference of the stud 142, such as at least 85% of the circumference of the stud 142, such as at least 90% of the circumference of the stud 142, such as at least 95% of the circumference of the stud 142, such as at least 99% of the circumference of the stud 142. The amount of the circumference of the stud 142 surrounded by the latch 126 can be defined by an angular displacement of a radial line extending from the central axis 130 (FIG. 2) which intersects the latch 126. In an embodiment, in the in-use, riding position the stud 142 can contact the latch 126 at over at least 30% of the circumference of the stud 142, such as over at least 40% of the circumference of the stud 142, such as over at least 45% of the circumference of the stud. Contact between the stud 142 and the latch 126 can be less than an amount of the circumference of the stud 142 surrounded by the latch 126.

The stud receiving area 146 can be in open communication with an external environment via an opening 148 through which the stud 142 passes to enter the stud receiving area 146. The stud receiving area 146 can define a height H and a length L. In an embodiment, a diameter D of the stud 142 can be in a range between and including 1.0 H and 1.5 H, such as in a range between and including 1.0 H and 1.25 H, such as in a range between and including 1.01 H and 1.15 H. In a more particular embodiment, the height H of the stud receiving area 146 can be approximately equal to the diameter D of the stud 142. In this regard, the stud 142 can form a close fit with the stud receiving area 146 in the vertical direction when the seat 112 is in the riding position. Close fit between the stud 142 and stud receiving area 146 in the vertical direction can prevent the seat 112 from wobbling relative to the frame 102 when the lawnmower 100 encounters uneven, bumpy terrain. Use of a plurality of latches 126 and associated latch engagement mechanisms 132 spaced apart from one another in the lateral direction of the lawnmower 100 can prevent lateral roll of the seat 112 upon encountering uneven, bumpy terrain.

In an embodiment, the diameter D of the stud 142 can be less than 0.99 L, such as less than 0.9 L, such as less than 0.85 L, such as less than 0.8 L, such as less than 0.7 L, such as less than 0.6 L, such as less than 0.5 L. In this regard, the stud 142 can translate relative to the latch engagement mechanism 132 in the length direction L of the stud receiving area 146.

As depicted in FIG. 4, the stud 142 is at an engaged location with respect to the stud receiving area 146 as seen when the seat 112 is in the in-use, riding position. Translating the stud 142 forward within the stud receiving area 146 allows the stud 142 to be released from the stud receiving area 146. However, as previously described, the third sidewall 138 can form a stop which prevents the latch 126 from translating rearwardly relative to the stud 142. In this regard, the stud 142 is not releasable from the stud receiving area 146 when the seat 112 is in the in-use riding position. To move the seat 112 to a position where the stud 142 can pass through the opening 148 to exit the stud receiving area 146, the seat 112 must be rotationally displaced in direction $R_1$ until a rear finger 150 of the latch 126 can clear the third sidewall 138.

Figure 5:
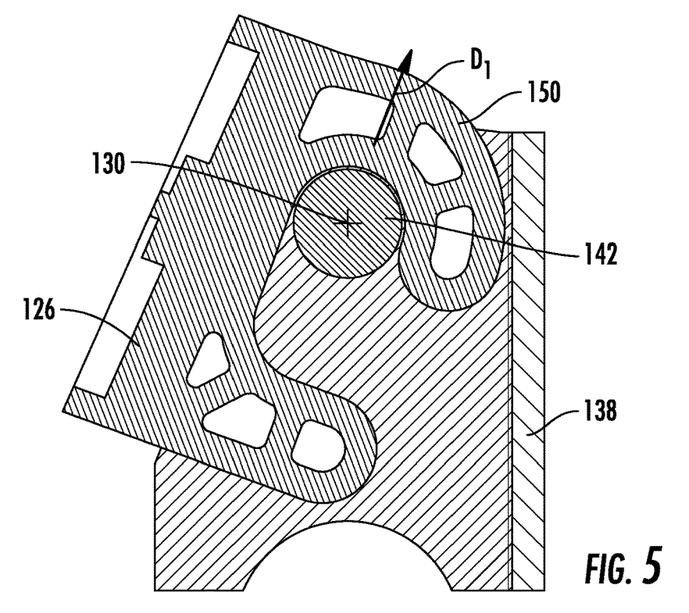
FIG. 5 is a cross-sectional side view of the latch in the rotated in a first direction from the in-use riding position in accordance with embodiments of the present disclosure.

FIG. 5 depicts the latch 126 rotationally displaced relative to the stud 142 about the axis 130. Unlike in the position depicted in FIG. 4, at the rotationally displaced position depicted in FIG. 5, the rear finger 150 of the latch 126 is positioned such that translation of the latch 126 in a first direction $D_1$ is possible without being stopped by the third sidewall 138. In an embodiment, the rear finger 150 of the latch 126 can be curved to prevent the latch 126 from snagging against the third sidewall 138 in the rotated state when translated in the first direction $D_1$. In an embodiment, rotational displacement from the in-use, riding position illustrated in FIG. 4 to the rotated, translatable position illustrated in FIG. 5 can be at least 30°, such as at least 35°, such as at least 40°, such as at least 45°, such as at least 50°, such as at least 55°, such as at least 60°, such as at least 65°, such as at least 70°. In certain instances, this rotation can occur in a forward direction of the lawnmower 100, i.e., rotation of the seat 112 from the in-use riding position can occur by rotating the seat 112 towards the steering element 106.

Figure 6:
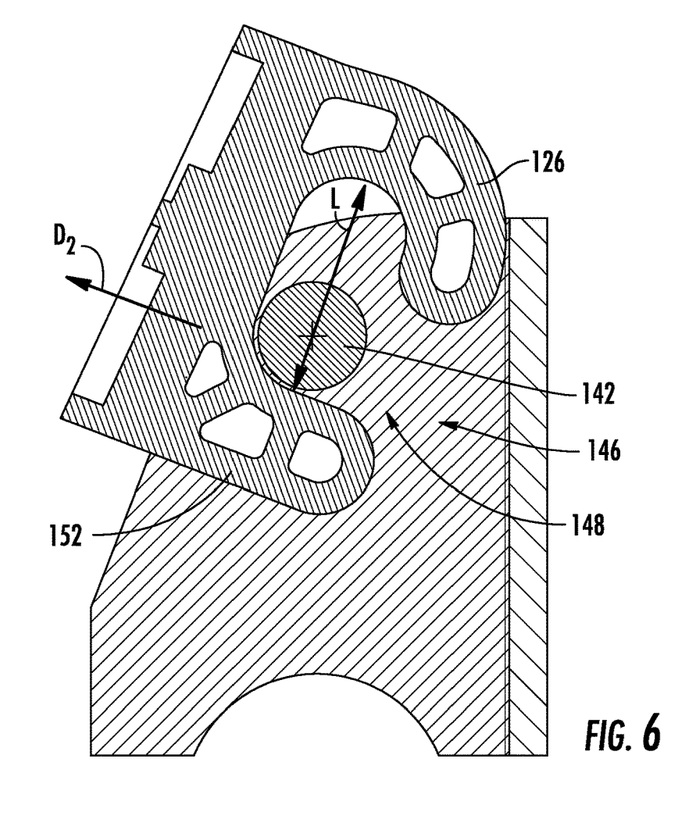
FIG. 6 is a cross-sectional side view of the latch translated in a first direction and ready to be translated in a second direction in accordance with embodiments of the present disclosure.

FIG. 6 depicts a view of the latch 126 after being translated in the first direction $D_1$ until a front finger 152 of the latch 126 reaches the stud 142 at which point the latch 126 can be translated in a second direction D2 to remove the latch 126 from the stud receiving area 146 through the opening 148 and remove the seat 112 from the frame 102. While the latch 126 is depicted as having been moved in direction $D_1$ across the entire length L of the stud receiving area 146, it may not be necessary to translate the latch across the entire length L as the opening 148 of the stud receiving area 146 may be accessible to the stud 142 prior to the front finger 152 reaching the stud 142.

In an embodiment, the second direction D2 can be perpendicular, or generally perpendicular, to the first direction $D_1$. In this regard, removal of the latch 126 from the stud 142 can include initially rotating the latch 126 until the latch 126 reaches a first threshold. Upon reaching the first threshold, the latch 126 can be translated in a first direction $D_1$ to reach a second threshold. Upon reaching the second threshold, the latch 126 can be translated in a second direction D2 angularly offset from the first direction $D_1$.

Figure 7:
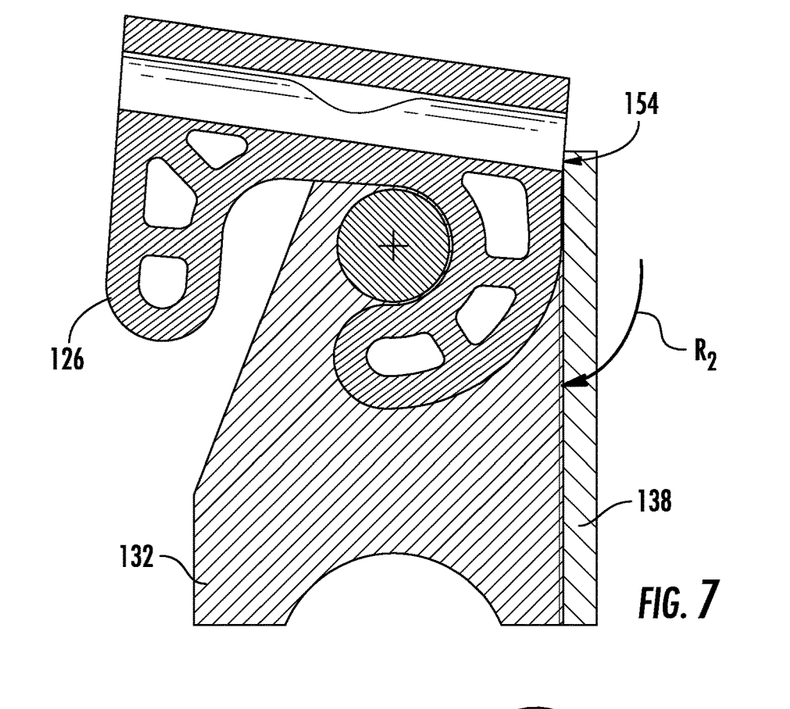
FIG. 7 is a cross-sectional side view of the latch rotating in a second direction from the in-use riding position in accordance with embodiments of the present disclosure.
Figure 8:
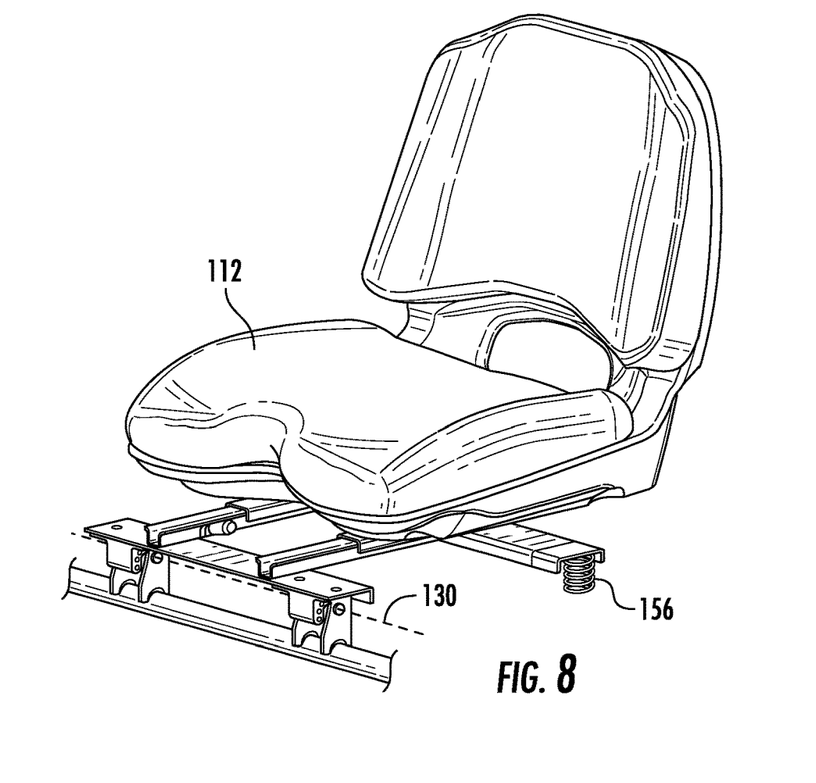
FIG. 8 is a perspective view of the seat in accordance with embodiments of the present disclosure.

FIG. 7 illustrates a side view of the latch 126 engaged with the latch engagement mechanism 132 in the in-use riding position in accordance with an embodiment. As depicted, the latch 126 can rotate in a rearward direction $R_2$ until the latch 126 comes to rest against the third sidewall 138 at a stop point 154. In such a manner, the seat 112 may pitch backwards by an allotted angular displacement during use. In an embodiment, the allotted angular displacement in the rearward direction $R_2$ can be at least 1°, such as at least 2°, such as at least 3°, such as at least 4°, such as at least 5°, such as at least 7.5°, such as at least 10°. Angular displacement of the seat 112 in the rearward direction $R_2$ can permit the seat 112 to dampen vibrations and impacts resulting from uneven, bumpy terrain. For instance, referring to FIG. 8, the seat 112 may be coupled to one or more dampeners 156. The one or more dampeners 156 can be disposed at a rear position of the seat 112. The one or more dampeners 156 can include, for example, one or more of springs, hydraulic pistons, struts, or the like. In the depicted embodiment, the dampeners 156 include coil springs. As the lawnmower 100 encounters uneven, bumpy terrain, the lawnmower 100 may experience sudden movements, e.g., shocks, in the vertical direction. As the lawnmower 100 is displaced vertically, the dampeners 156 can absorb force from the lawnmower 100 prior to the force reaching the seat 112 so as to dampen the seat 112 and improve rider experience and comfort. Such dampening may require the seat 112 to deflect in a direction relative to the lawnmower 100 about the axis 130. In particular, the seat 112 may rotate in the rearward direction $R_2$. To permit such rearward rotation, the latches 126 can be configured to rotate in the direction $R_2$ as shown in FIG. 7. The seat 112 may also be able to rotate in the opposite direction $R_1$ (FIG. 4) to accommodate sudden movement, e.g., shocks, in the vertical direction without disengaging from the frame 102.

It should be understood that in one or more non-illustrated embodiments, the latch can be part of the frame and the latch engagement mechanism can be part of the seat without deviating from the scope of the disclosure.

Figure 9:
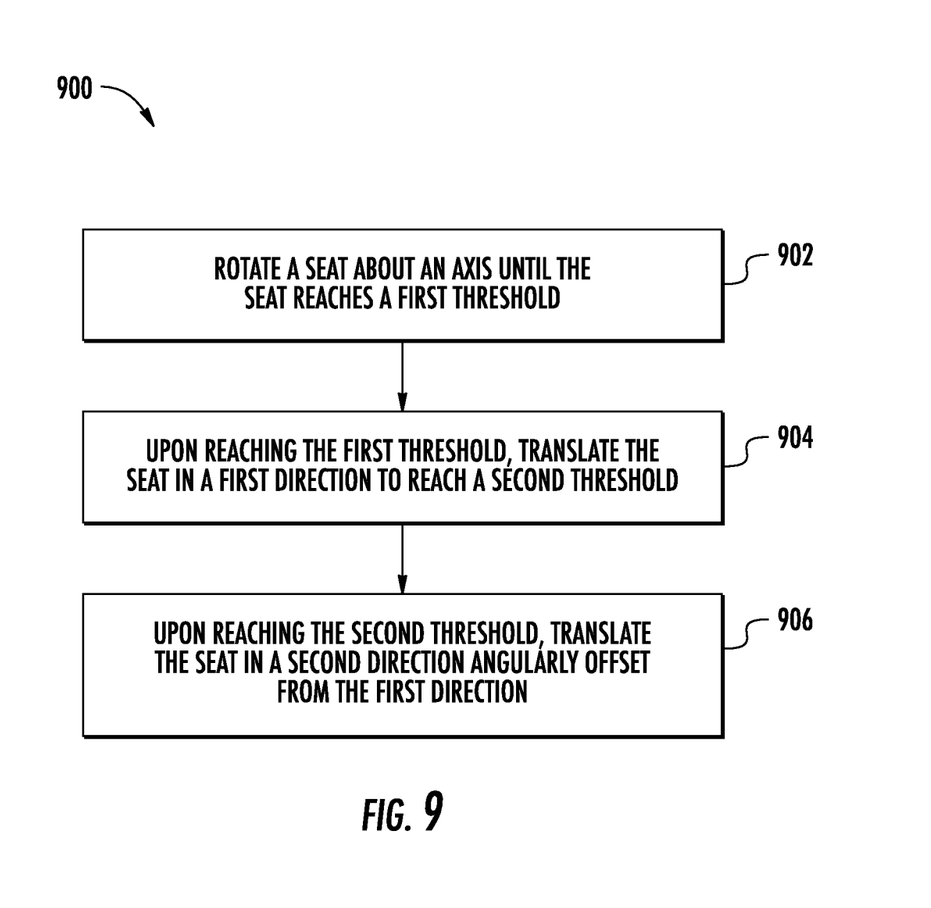
FIG. 9 is a method of removing a seat from a lawnmower in accordance with embodiments of the present disclosure.

FIG. 9 illustrates a flowchart of a method 900 of removing a seat from a lawnmower. The seat can include one or more latches (e.g., latch(es) 126) that interface with one or more latch engagement mechanisms (e.g., latch engagement mechanism(s) 132) coupled to a frame of the lawnmower. Prior to initiating the method 900, the seat may be coupled to the frame of the lawnmower.

The method 900 can include a step 902 of rotating the seat about an axis until the seat reaches a first threshold. In an embodiment, the step 902 of rotating the seat can include rotating the seat in a forward direction, e.g., toward a steering element of the lawnmower. The seat can be rotated by an angular displacement of at least 30°, such as at least 35°, such as at least 40°, such as at least 45°, such as at least 50°, such as at least 55°, such as at least 60°, such as at least 65°, such as at least 70°. In certain instances, the step 902 of rotating the seat can terminate prior to the seat reaching a maximum angular displacement allowable by the seat and lawnmower. That is, step 902 may be completed without completely rotating the seat a maximum angular displacement. In other instances, the step 902 of rotating the seat can terminate upon the seat reaching a rotational stop which prevents further rotation of the seat. In certain instances, termination of the step 902 can be indicated by a tactile response, an audible response, or upon a visual indication.

Upon rotating the seat at step 902 to the first threshold, the method 900 can further include a step 904 of translating the seat in a first direction to reach a second threshold. In certain instances, translation of the seat at step 904 can include translating the seat in a generally linear direction. As shown in FIG. 5, the linear direction can be in a generally upward direction. Translation of the seat at step 904 may be prevented prior to the seat reaching the first threshold by one or more surfaces of a latch engagement mechanism or another surface of the lawnmower 100.

Upon reaching the second threshold at step 904, the method 900 can further include a step 906 of translating the seat in a second direction. The second direction can be angularly offset from the first direction. In an embodiment, this angular offset between the first and second directions can be at least 20°, such as at least 30°, such as at least 40°, such as at least 50°, such as at least 60°, such as at least 70°, such as at least 80°. In a particular embodiment, the angular offset can be approximately 90°. Upon translating in the second direction, the latch of the seat can be clear of the latch engagement mechanism such that the seat can be removed from the lawnmower. With the seat removed, previously inaccessible portions of the lawnmower can become accessible.

As described above, removal of the seat from the lawnmower can occur without the use of tools. For example, removal of traditional seats often require the removal of one or more threaded fasteners, thus necessitating the use of a screwdriver, allen wrench, or the like. Instead, removal of seats in accordance with embodiments described herein can be performed without such tools, thereby allowing the operator to quickly access under-seat locations without requiring the operator to carry tools or return to a tool storage area to obtain required tools. In this regard, removal of the seat may be performed in less than 90 seconds, such as less than 60 seconds, such as less than 45 seconds, such as less than 30 seconds, such as less than 15 seconds, such as less than 10 seconds. Reinstalling the seat on the lawnmower can similarly be performed using a reverse operation which also does not require the use of tools.

Moreover, removal of the seat may not require movement of any portion of the lawnmower other than the seat. That is, for instance, removal of the seat can be performed without activating or undoing any latches, ties, switches, or the like which lock the seat to the frame. Instead, the operator can remove the seat simply by grabbing and moving only the seat as described above. This can reduce the time required to remove the seat and access under-seat locations and prevent the need to grab dirty portions of the lawnmower which may become covered in grass clippings and debris during mowing operations.

Further aspects of the invention are provided by one or more of the following embodiments:

Embodiment 1. A riding lawnmower comprising: a frame; a walking element coupled to the frame to move the lawnmower relative to an underlying ground surface; and a seat selectively coupled to the frame, the seat comprising: one or more rails; a lower support adjustably coupled to the one or more rails; a backrest coupled to the lower support; and a latch coupled to the lower support through at least one of the one or more rails, the latch being selectively engageable with the frame to maintain the seat in a riding position, wherein the seat is removable from the frame by rotating the seat about a horizontal axis.

Embodiment 2. The riding lawnmower of claim 1, wherein the frame comprises a stud configured to selectively couple the latch to the frame, and wherein the latch surrounds at least 75% of a circumference of the stud when the seat is coupled to the frame.

Embodiment 3. The riding lawnmower of claim 2, wherein the latch comprises a body defining a stud receiving area and an opening into which the stud passes to enter the stud receiving area.

Embodiment 4. The riding lawnmower of claim 3, wherein the stud is configured to pass through the opening only when the seat is angularly displaced from a riding position by at least 45°, angular displacement of the seat being measured about an axis of the stud.

Embodiment 5. The riding lawnmower of claim 1, wherein the lawnmower comprises a latch engagement mechanism coupled to the frame, the latch engagement mechanism comprising: a first sidewall; a second sidewall; a stop coupled between the first and second sidewalls at a rear location of the latch engagement mechanism; and a stud extending from at least one of the first and second sidewalls, the stud configured to interface with the latch to couple the seat to the lawnmower, wherein the first sidewall, the second sidewall, and the stop define a receiving area configured to receive at least a portion of the latch.

Embodiment 6. The riding lawnmower of claim 5, wherein the stop prevents the latch from translating in at least a rearward direction when the seat is coupled to the frame.

Embodiment 7. The riding lawnmower of claim 1, wherein removal of the seat requires rotational displacement of the seat followed by linear translation of the seat in at least two different directions.

Embodiment 8. The riding lawnmower of claim 1, wherein removal of the seat does not require movement of any portion of the lawnmower other than the seat.

Embodiment 9. A seat for a lawnmower, the seat comprising: a one or more rails; a lower support adjustably coupled to the one or more rails; a backrest coupled to the lower support; and a latch coupled to the lower support through at least one of the one or more rails, the latch being selectively engageable with a frame of the lawnmower to maintain the seat in a riding position, wherein the seat is configured to be removable from the frame by rotating the seat about a horizontal axis.

Embodiment 10. The seat of claim 9, wherein removal of the seat from the frame requires rotational displacement of the seat followed by linear translation of the seat in at least two different directions.

Embodiment 11. The seat of claim 9, wherein removal of the seat does not require movement of any portion of the lawnmower other than the seat.

Embodiment 12. The seat of claim 9, wherein the latch comprises a plurality of latches disposed along a same axis, and wherein each of the plurality of latches is coupled to one of the one or more rails through an intermediary member.

Embodiment 13. The seat of claim 9, wherein the seat is configured to be removed from the frame when the seat is angularly displaced from a riding position by at least 45°.

Embodiment 14. The seat of claim 9, wherein the seat further comprises one or more dampeners, the one or more dampeners configured to prevent shock from being transferred to the lower support when the lawnmower is disposed on an uneven, bumpy surface.

Embodiment 15. A method of removing a seat from a lawnmower, the method comprising: rotating the seat about an axis until the seat reaches a first threshold; upon reaching the first threshold, translating the seat in a first direction to reach a second threshold; and upon reaching the second threshold, translating the seat in a second direction angularly offset from the first direction.

Embodiment 16. The method of claim 15, wherein rotating the seat is performed by moving the seat forward about a rotational axis associated with the stud.

Embodiment 17. The method of claim 15, wherein translating the seat in the first direction is performed in a direction generally parallel with one or more rails of the seat, and wherein translating the seat in the second direction is performed in a direction generally perpendicular with the one or more rails of the seat.

Embodiment 18. The method of claim 15, wherein the method of removing the seat is performed without the use of tools.

Embodiment 19. The method of claim 15, wherein reaching the first threshold requires a rotational displacement of at least 45°.

Embodiment 20. The method of claim 15, wherein the seat is coupled to the frame through one or more rails, and wherein the seat is movable relative to the one or more rails to adjust a relative riding position of the seat.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:
1. A riding lawnmower comprising:
a frame;
a walking element coupled to the frame to move the lawnmower relative to an underlying ground surface; and
a seat selectively coupled to the frame, the seat comprising:
one or more rails;
a lower support adjustably coupled to the one or more rails;
a backrest coupled to the lower support; and a latch coupled to the lower support through at least one of the one or more rails, the latch being selectively engageable with the frame to maintain the seat in a riding position, wherein the seat is removable from the frame by rotating the seat about a horizontal axis, and wherein removal of the seat from the frame does not require movement of any portion of the lawnmower other than the seat.

2. The riding lawnmower of claim 1, wherein the frame comprises a stud configured to selectively couple the latch to the frame, and wherein the latch surrounds at least 75% of a circumference of the stud when the seat is coupled to the frame.

3. The riding lawnmower of claim 2, wherein the latch comprises a body defining a stud receiving area and an opening into which the stud passes to enter the stud receiving area.

4. The riding lawnmower of claim 3, wherein the stud is configured to pass through the opening only when the seat is angularly displaced from a riding position by at least 45°, angular displacement of the seat being measured about an axis of the stud.

5. The riding lawnmower of claim 1, wherein the lawnmower comprises a latch engagement mechanism coupled to the frame, the latch engagement mechanism comprising:
a first sidewall;
a second sidewall;
a stop coupled between the first and second sidewalls at a rear location of the latch engagement mechanism; and
a stud extending from at least one of the first and second sidewalls, the stud configured to interface with the latch to couple the seat to the lawnmower,
wherein the first sidewall, the second sidewall, and the stop define a receiving area configured to receive at least a portion of the latch.

6. The riding lawnmower of claim 5, wherein the stop prevents the latch from translating in at least a rearward direction when the seat is coupled to the frame.

7. The riding lawnmower of claim 1, wherein removal of the seat requires rotational displacement of the seat followed by linear translation of the seat in at least two different directions.

8. The riding lawnmower of claim 1, wherein removal of the seat does not require movement of any portion of the lawnmower other than the seat.

9. A seat for a lawnmower, the seat comprising:
a one or more rails;
a lower support adjustably coupled to the one or more rails;
a backrest coupled to the lower support; and
a latch coupled to the lower support through at least one of the one or more rails, the latch being selectively engageable with a frame of the lawnmower to maintain the seat in a riding position, wherein the seat is removable from the frame by rotating the seat about a horizontal axis, and wherein removal of the seat from the frame does not require movement of any portion of the lawnmower other than the seat.

10. The seat of claim 9, wherein removal of the seat from the frame requires rotational displacement of the seat followed by linear translation of the seat in at least two different directions.

11. The seat of claim 9, wherein the method of removing the seat is performed without the use of tools.

12. The seat of claim 9, wherein the latch comprises a plurality of latches disposed along a same axis, and wherein each of the plurality of latches is coupled to one of the one or more rails through an intermediary member.

13. The seat of claim 9, wherein the seat is configured to be removed from the frame when the seat is angularly displaced from a riding position by at least 45°.

14. The seat of claim 9, wherein the seat further comprises one or more dampeners, the one or more dampeners configured to prevent shock from being transferred to the lower support when the lawnmower is disposed on an uneven, bumpy surface.

15. A method of removing a seat from a lawnmower, the method comprising:
rotating the seat about an axis in a first direction until the seat reaches a first threshold;
upon reaching the first threshold, translating the seat in a first direction to reach a second threshold; and
upon reaching the second threshold, translating the seat in a second direction angularly offset from the first direction,
wherein the method of removing the seat is performed with the use of tools.

16. The method of claim 15, wherein a frame of the lawnmower comprises a stud configured to selectively couple the seat to the frame, and wherein rotating the seat is performed by moving the seat forward about a rotational axis associated with the stud.

17. The method of claim 15, wherein translating the seat in the first direction is performed in a direction generally parallel with one or more rails of the seat, and wherein translating the seat in the second direction is performed in a direction generally perpendicular with the one or more rails of the seat.

18. The method of claim 15, wherein the seat is pivotable about the axis by an allotted angular displacement during use, the allotted angular displacement being in a second direction opposite the first direction.

19. The method of claim 15, wherein reaching the first threshold requires a rotational displacement of at least 45°.

20. The method of claim 15, wherein translating the seat in the first direction is impermissible until a rear finger of a latch of the seat clears a sidewall of a frame, the sidewall being disposed behind the rear finger.

* * * * *